July 14, 1970      H. R. GREEN      3,520,346
WINDOW BLIND

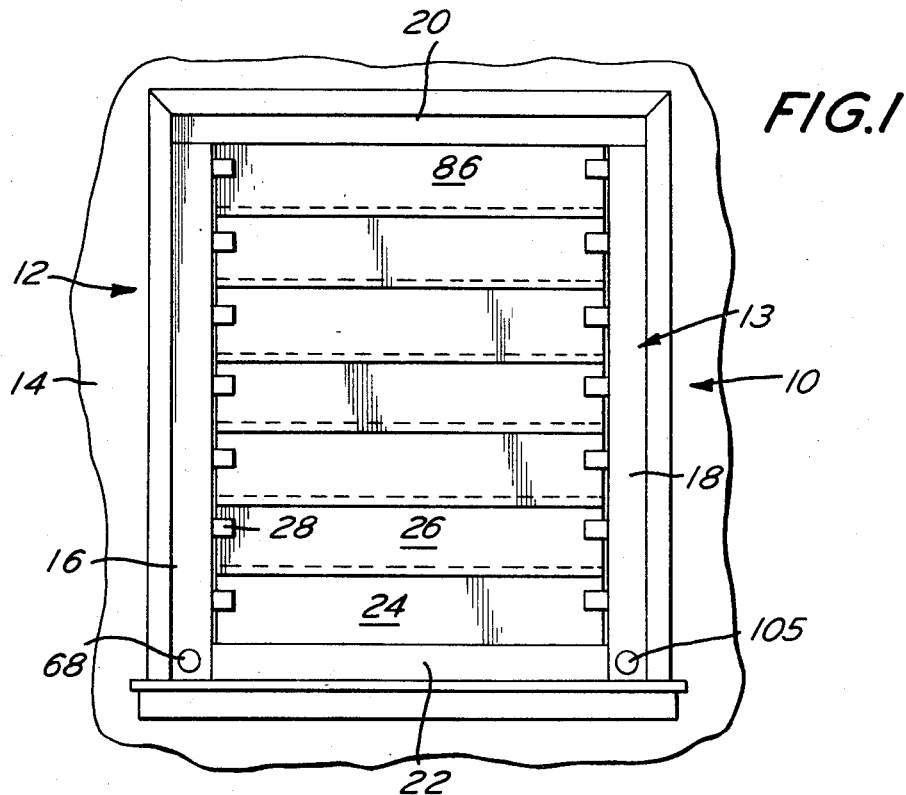
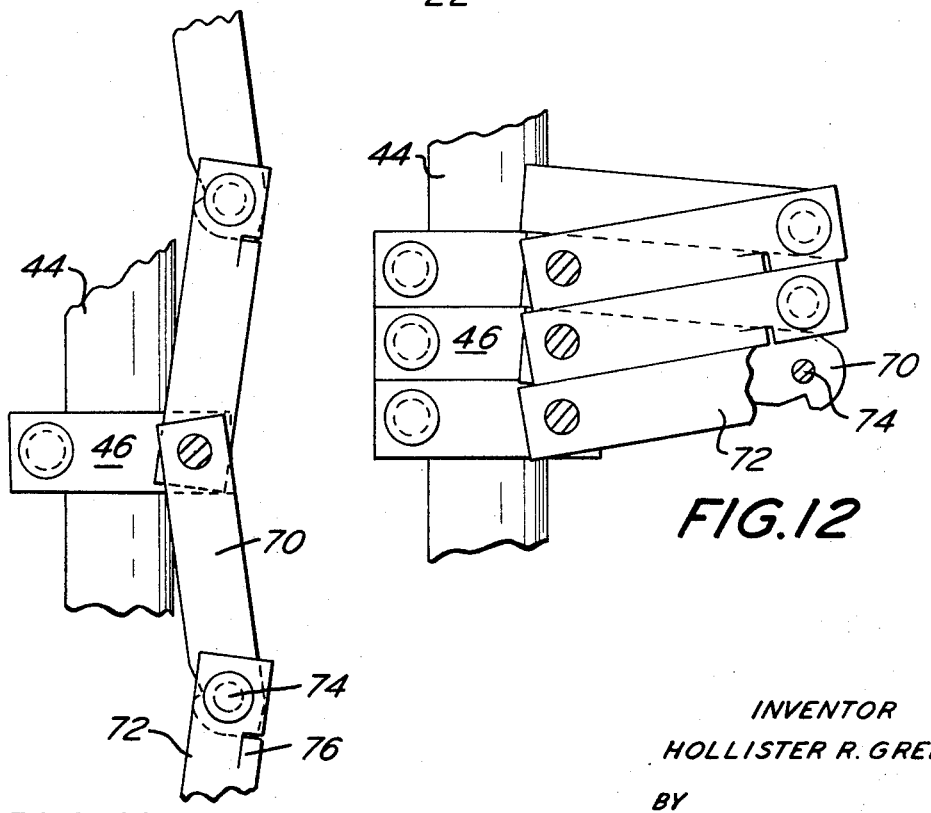

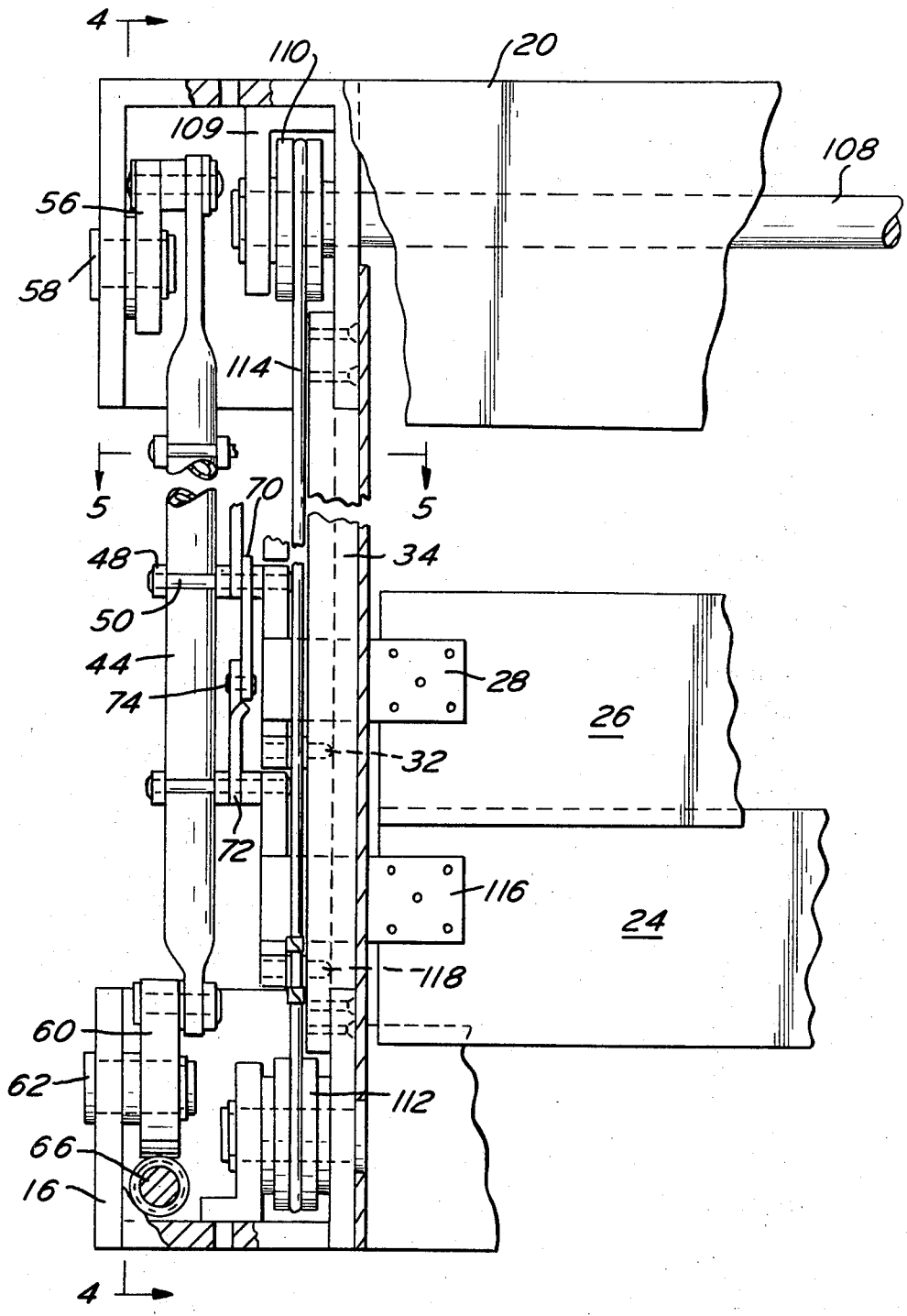

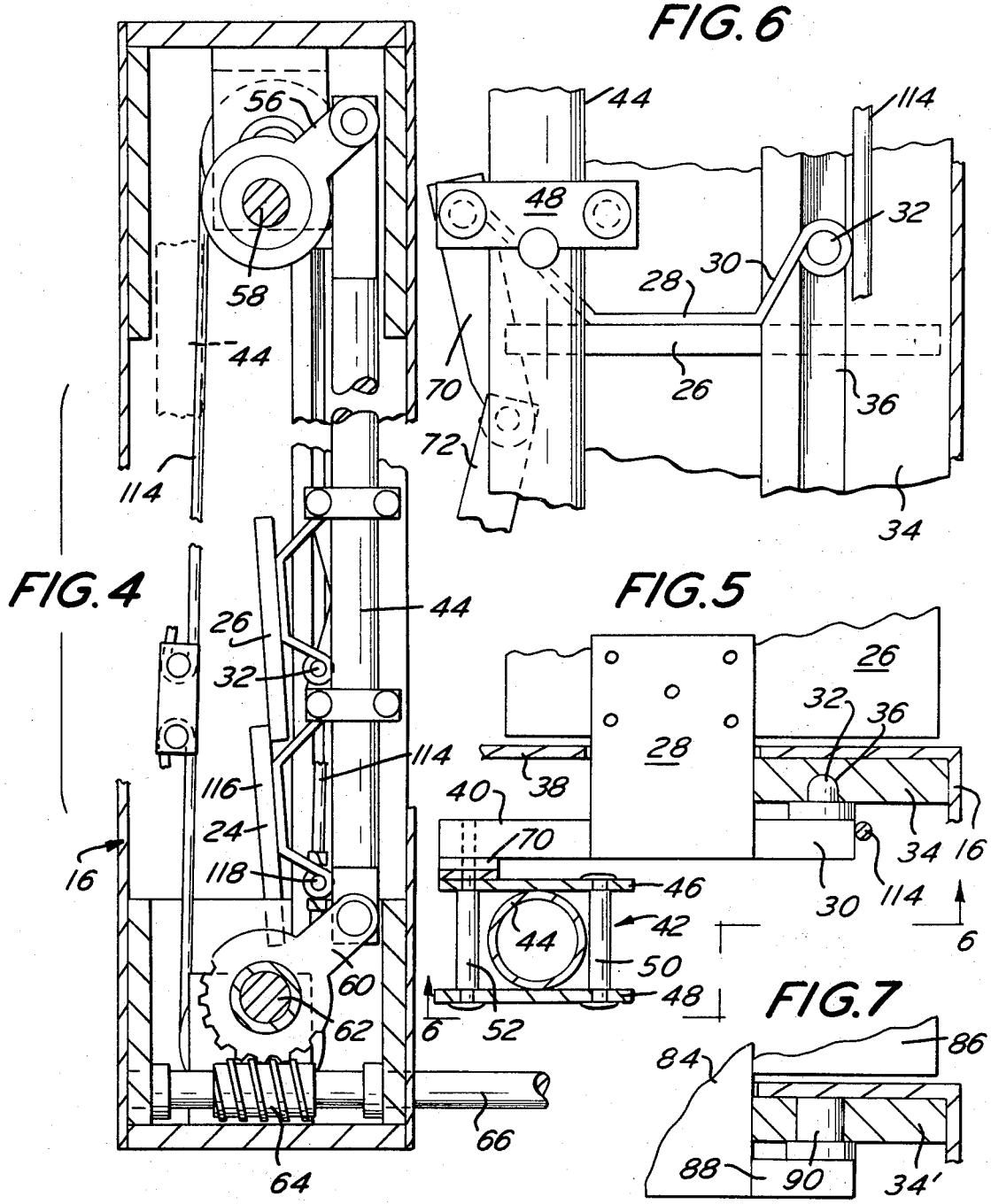

Filed Aug. 19, 1968      6 Sheets-Sheet 5

INVENTOR
HOLLISTER R. GREEN

BY
Seidel & Gonda

ATTORNEYS.

July 14, 1970     H. R. GREEN     3,520,346
WINDOW BLIND
Filed Aug. 19, 1968     6 Sheets-Sheet 6
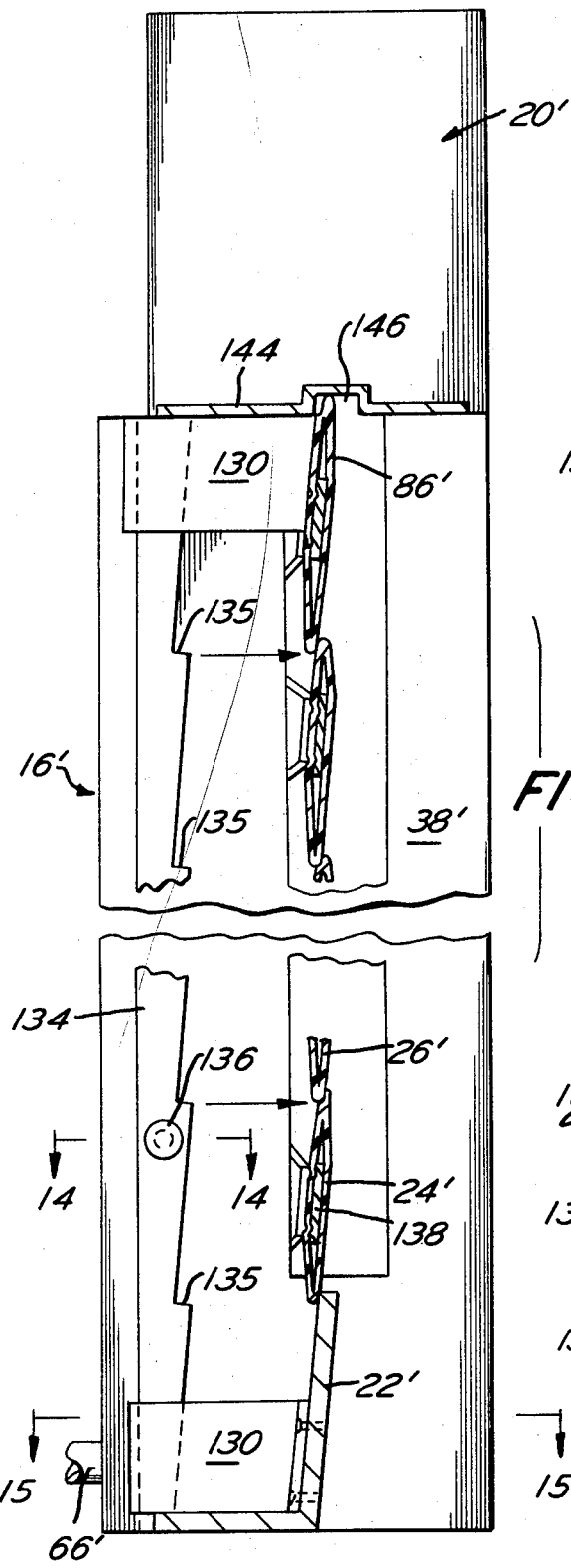
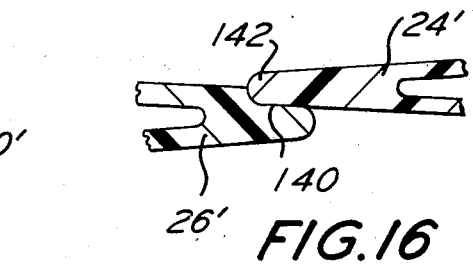
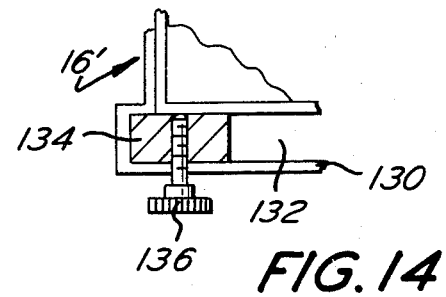
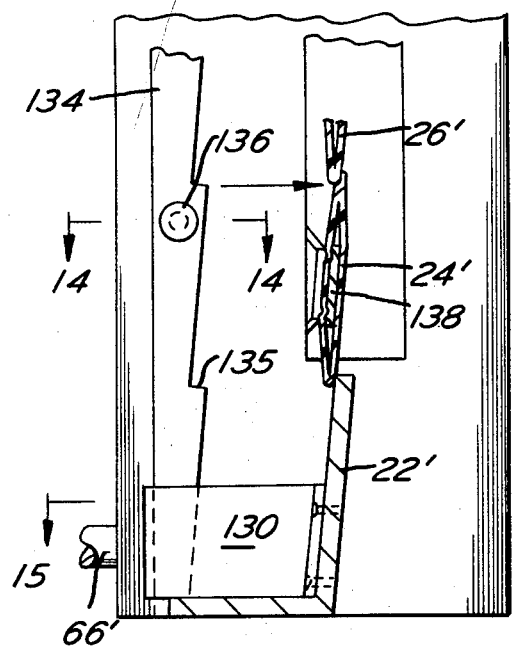
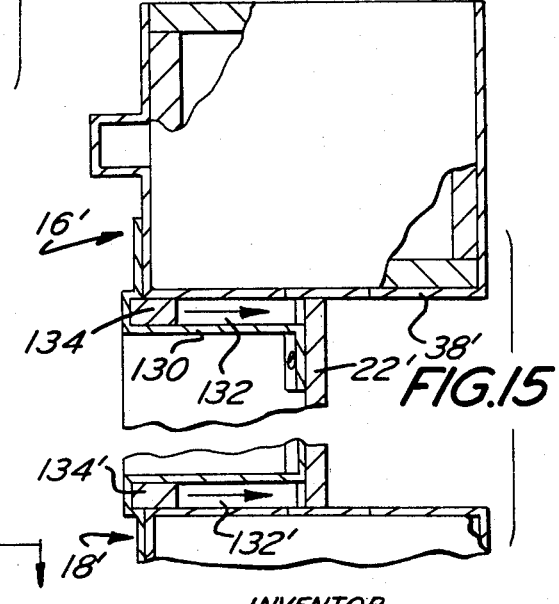
INVENTOR
HOLLISTER R. GREEN
BY
Seidel & Gonda
ATTORNEYS.

United States Patent Office 3,520,346
Patented July 14, 1970

3,520,346
WINDOW BLIND
Hollister R. Green, 420 N. Broadway,
Pitman, N.J. 08071
Filed Aug. 19, 1968, Ser. No. 753,436
Int. Cl. E06b 9/26; E04f 10/08
U.S. Cl. 160—165                                   13 Claims

ABSTRACT OF THE DISCLOSURE

The window blind includes parallel slats which can be raised, disposed upright in overlapping relation, or disposed horizontally. The slats pivot about an axis offset from the longitudinal axis of the slats by means of pins which enter vertical guide slots. Separate rotary handles are provided to effect the raising, lowering and tilting of the slats. Raising the slats is accomplished by one handle connected to an endless cable having a portion connected to the lowermost slat. Tilting is accomplished by the other handle connected to an oscillating upright member coupled to each slat. Latch means are provided effective between adjacent slats to latch the slats in a closed overlapping disposition.

---

This invention is directed to a window blind having parallel slats which can have a vertical or horizontal position as well as any intermediate position. When the slats are in a vertical overlapping disposition, they form a sealed barrier against air flow and may be used as a barrier against burglary. Two operating handles are provided, one for changing the elevation of the slats and one for changing the inclination of the slats. Unlike venetian blinds, the slats of the present invention are not perforated in their middle section to permit tape, cord, or other actuating structure to extend therethrough.

The window blind of the present invention preferably includes a frame adapted to be fixed in a window frame. The blind may be installed in new buildings or in existing buildings. The slats are guided at their ends for vertical movement by side portions of the frame by pins which enter a groove in an upright member. The slats are coupled at one end to a vertical oscillating member which is adapted to cause the slats to tilt about their guide pins from a vertical to a horizontal position. The axis of the pins on each slat is offset from the longitudinal axis of the slat.

In order that the window blind may be burglarproof, the slats are made of metal and two or more of the slats may be latched together in the vertical overlapping disposition. When two of the slats are latched together from the inside of the building, none of the slats may be tilted. Raising and lowering of the slats may only be accomplished from inside the building.

The window blind of the present invention has the advantage that the slats remain stationary at whatever height or inclination they are moved, regardless of the air currents passing through them. Thus, there is provided a blind that does not rattle or slam and remains immobile for cleaning.

It is an object of this invention to provide a novel window blind.

It is another object of this invention to provide a window blind which includes tiltable slats which can be rendered airtight.

It is a still further object of this invention to provide a window blind which is burglarproof.

It is another object of this invention to provide a window blind which can be installed in an opening in a building wall as a self-contained unit by persons of minimum skill.

For the purpose of illustrating the invention, there are shown in the drawings forms which are presently preferred; it being understood, however, that this invention is not limited to the precise arrangements and instrumentalities shown.

FIG. 1 is a front elevation view of the window blind of the present invention as seen from inside a building and with the blinds in a vertical or closed position.

FIG. 2 is an enlarged detail view of the left side of the blind in FIG. 1, with portions broken away and hatched for clarity of illustration.

FIG. 4 is a sectional view taken along the line 4—4 in FIG. 2.

FIG. 5 is a sectional view taken along the line 5—5 in FIG. 2.

FIG. 6 is an end view taken along the line 6—6 in FIG. 5.

FIG. 7 is an enlarged detail view of the pin and hole structure as used only on the uppermost slat.

FIG. 11 is a partial side elevation of links.

FIG. 12 is a partial side elevation of links in a collapsed position.

FIG. 13 is a transverse sectional view of the second embodiment of the present invention.

FIG. 14 is a partial sectional view taken along line 14—14 in FIG. 13.

FIG. 15 is a sectional view taken along the line 15—15 in FIG. 13.

FIG. 16 is an enlarged sectional view of the slats showing them in interengagement with each other.

Figure 3:
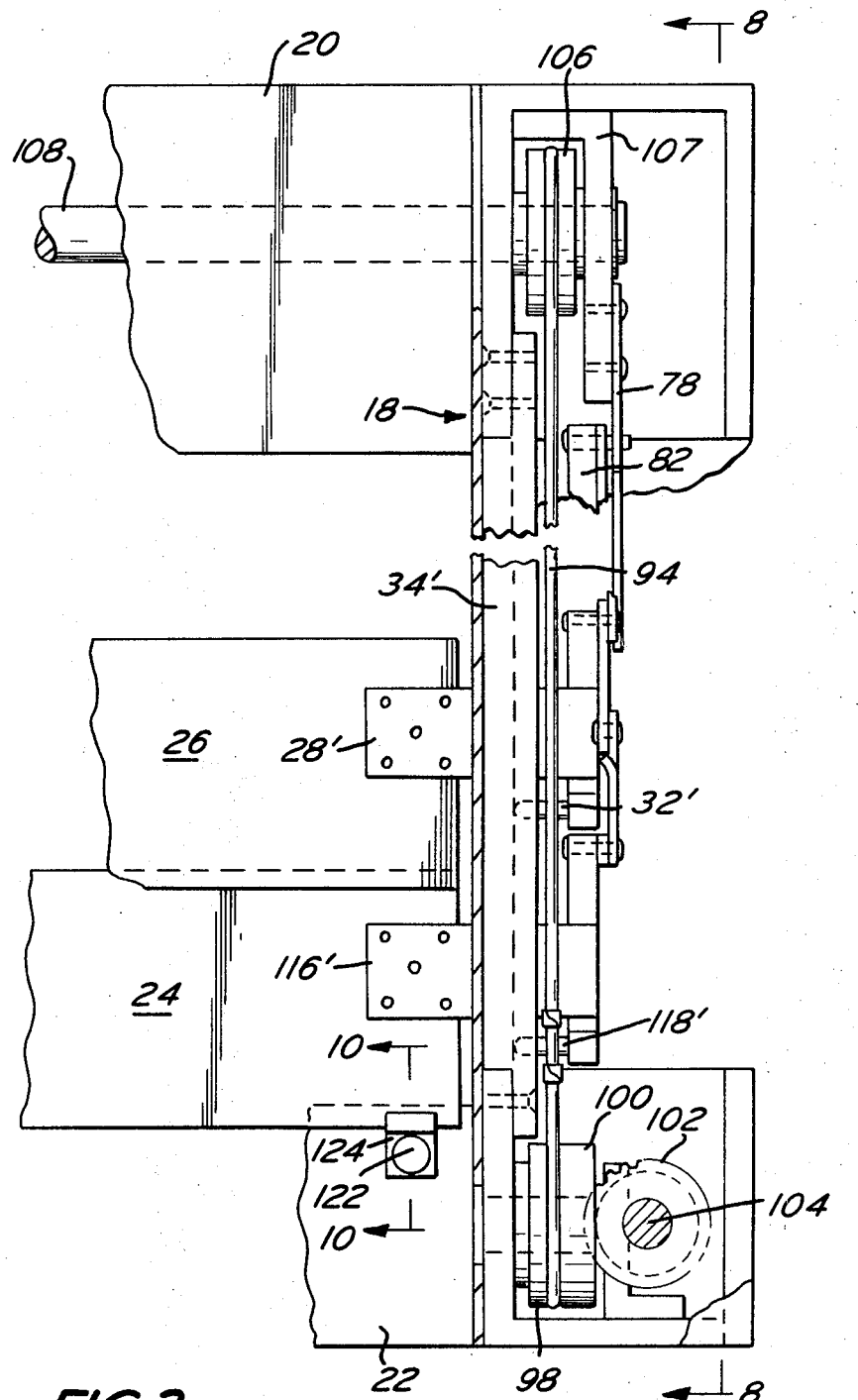
FIG. 3 is an enlarged detail view of the right side of the blind in FIG. 1, with portions broken away and hatched for clarity of illustration.

Referring to the drawings in detail wherein like numerals indicate like elements, there is shown in FIG. 1 a window blind designated generally as 10. Blind 10 is mounted in a window frame 12 in a wall 14. The blind includes a frame 13 having upright side portions 16 and 18 interconnected by a header 20 and a base 22. The blind 20 may be made in almost any size to fit into almost all window frames. The blind frame 13 may be joined to the frame 12 in any convenient manner such as by screws extending between the frames. In new buildings, window frame 12 will be eliminated and trim can be applied to cover the mechanisms within the side portions 16 and 18 so that the wall would in effect be the frame.

A plurality of parallel slats are provided. For the purpose of this disclosure, most of the structure can be described by referring to the lowermost slat 24 and the slat next above which is designated 26. All other slats are identical except as may be specifically mentioned hereinafter in connection with the uppermost slat.

Slat 26 as shown is flat and made from metal. It may be an extruded aluminum member which is solid or hollow as desired. The slats are preferably rigid. If desired, the slats may be slightly arcuate in cross section. A T-shaped adapter 28 has its middle leg secured to the left-hand end of slat 26 and extends therebeyond. See FIGS. 2 and 6. A similar adapter is secured to the other end of slat 26 as will be described hereinafter. Adapter 28 has one end leg 30 bent upwardly at about a 45° angle with respect to the plane of the middle leg. See FIG. 4 wherein slat 26 is vertically disposed and FIG. 6 wherein slat 26 is horizontally disposed. When the slats are horizontally disposed, the side face of adapter 28 abuts a side of channel 34 which acts as a limit stop. See FIG. 5.

The terminal end of leg 30 rotatably supports a pin 32 which extends into a vertical groove 36 in a channel 34. Channel 34 is inside the side portion 16 of the blind frame. The end legs 30 and 40 are separated from slat 26 by a wall 38 on the blind frame. The middle leg of adapter 28 extends through a vertical slot in said wall 38. The end leg 40 is bent upwardly in the same manner as leg 30 and terminates in a cage designated generally as 42.

Cage 42 embraces a vertical rigid member 44 which is preferably a hollow tube but may be a solid rod or bar. The cage 42, as shown more clearly in FIG. 5 includes side bars 46 and 48 interconnected at their ends by rotatable bolts 50 and 52 having snap-on retainers. Bolts 50 and 52 will roll along member 44 without rattling. The clearance between member 44 and bars 46, 48 is minimal but sufficient to prevent binding or frictional engagement. Bolt 52 is rotatably connected to the terminal end of leg 40. As shown, the cage 42 is slightly larger than the periphery of member 44.

The upper end of member 44 is flattened and rotatably coupled to a crank arm 56 which rotates about a pin 58 on the frame portion 16. The lower end of member 44 is also flattened and is rotatably coupled to a crank arm 60 which rotates about pin 62 on the frame portion 16. The crank arms 56 and 60 are identical except for the gear teeth segment on the hub of arm 60. See FIGS. 2 and 4. The pins 58 and 62 are disposed one above the other.

The gear segment on the hub of arm 60 is meshed with a worm screw 64 on shaft 66. A handle 68 is provided on shaft 66 and accessible from inside the building. Rotation of handle 68 rotates the crank arms 56 and 60 to move member 44 from the solid line position in FIG. 4 to the phantom position in FIG. 4. In doing so, the slats tilt from their vertical position to their horizontal position.

A pair of pivotably interconnected links interconnect adjacent slats on each end of the slats. As shown more clearly in FIGS. 2 and 11, the slats 24 and 26 are interconnected by links 70 and 72 at their lefthand end. The link 70 rotates about the axis of bolt 52. The free end of link 72 rotates about the axis of a similar bolt on a cage associated with the slat 24. One of the links is provided with a limit stop which cooperates with the other link to prevent the links from passing beyond dead center. Such means includes a struck-out portion or tab 76 on link 72 which contacts the adjacent end of the link 70 before the links pass over dead center. When the slats are in any disposition between vertical and horizontal, the links are orientated as shown in FIG. 11. The links interconnect the bolts 52 at the cages and therefore move with the cages along member 44. When the slats are raised upwardly as will be described hereinafter, the links collapse on one another as shown in FIG. 12.

Figure 8:
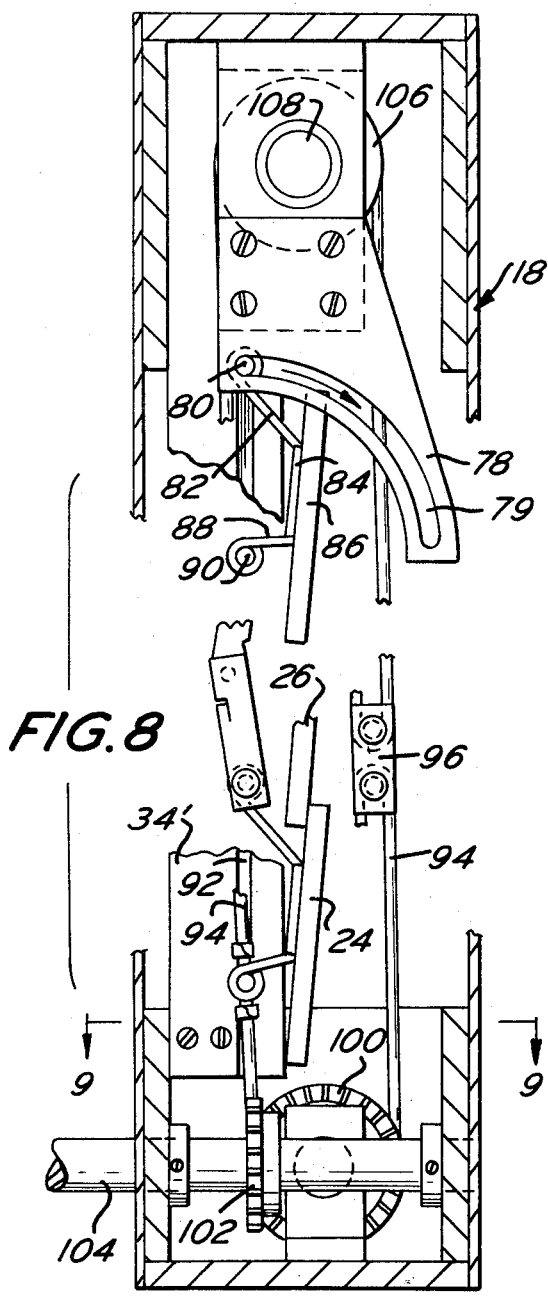
FIG. 8 is a sectional view taken along the line 8—8 in FIG. 3.

The righthand ends of the slats are provided with adapters as described above. Except for the uppermost slat, each of the adapters supports a pin riding in a groove in a channel corresponding to groove 36 in channel 34. In FIG. 8, the channel cooperating with the righthand end is designated as 34'. The righthand ends of the slats are also interconnected with links as described above.

Within the frame portion 18 at the righthand end of the window blind 10, there is provided a cam track 78 having an arcuate cam slot therein. Track 78 is removably secured to a bracket 107 by screws. A rotatable pin 80 rides in the arcuate slot 79. Pin 80 is rotatably supported by end leg 82 on an adapter 84. Adapter 84 has its middle leg secured to the uppermost slat 86.

Figure 9:
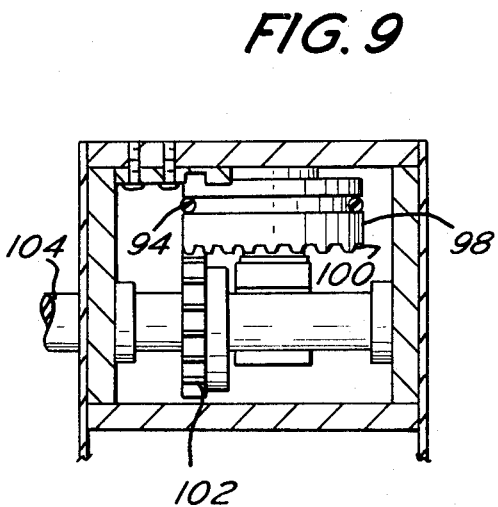
FIG. 9 is a sectional view taken along the line 9—9 in FIG. 8.

A means is provided to raise and lower the slats, other than slat 86, sequentially beginning with the bottom slat 24. Such means includes a flexible cable 94 having its ends interconnected by a connector 96. See FIG. 8. The thusly formed endless cable 94 extends around a sheave 98 having an integral gear 100. See FIGS. 8 and 9. The links extend or collapse only in response to motion of cable 94. See FIGS. 11 and 12.

The gear 100 is meshed with teeth on gear 102. Gear 102 is fixedly secured to a shaft 104. Shaft 104 is suitably journaled at opposite sides of the frame portion 18. The free end of shaft 104 is provided with a handle 105 to facilitate rotation of shaft 104 and consequent movement of the cable 94. See FIG. 1.

The endless cable 94 extends around a pulley 106 at the upper end of frame portion 18. See FIGS. 3 and 8. Pulley 106 is fixedly secured to the righthand end of a horizontally disposed shaft 108. The righthand end of shaft 108 is rotatably supported by the same bracket which supports the cam track 78 and which is designated generally as 107.

The shaft 108 is behind the header 120 and extends to the frame portion 16. As shown more clearly in FIG. 2, the lefthand end of shaft 108 is rotatably supported by suitable bearings in a bracket 109. A pulley 110 is fixedly secured to the lefthand end of shaft 108 within the frame portion 16.

A pulley 112 is rotatably supported at the lower end of frame portion 16 as shown more clearly in FIG. 2. An endless belt 114 extends around the pulleys 110 and 112.

An adapter 116 is fixedly secured to the lefthand end of slat 24 as shown more clearly in FIG. 2. Adapter 116 is identical with adapter 28. The pin 118 secured to an end leg of adapter 116 extends into the groove 36 in channel 34 and is also rotatably secured to the adjacent portion of the belt or cable 114. It will be apparent that elements 94 and 114 may be an endless cable, belt, chain, etc.

An adapter 116', identical with adapter 116, is fixedly secured to the righthand end of the lowermost slat 24 as shown more clearly in FIG. 3. A pin 118' secured to an end leg on the adapter 116' extends into the guide slot in channel 34' and is also rotatably secured to the cable 94. Hence, rotation of handle 105 will cause both ends of the lowermost slat 24 to raise vertically from a horizontal disposition until it contacts the slat 26 and then carries the same with it until contact is made with the next slat thereabove. In this manner, the slats are sequentially moved upwardly until they overlie one another in a horizontal disposition adjacent the header 20. When it is desired to lower the slats, the handle 104 is rotated in the opposite direction, thereby lowering all of the slats sequentially with the spacing between slats being determined by the linkage interconnecting adjacent slats. Raising and lowering of the slats is preferably accomplished from a horizontal position of the slats. However, the slats may be inclined at an angle up to 30° from the horizontal during such movement. As the slats are raised or lowered, they are guided by cooperation between the offset pins on the adapter on each end of each slat which cooperates with the guide channels 34 or 34'.

Figure 10:
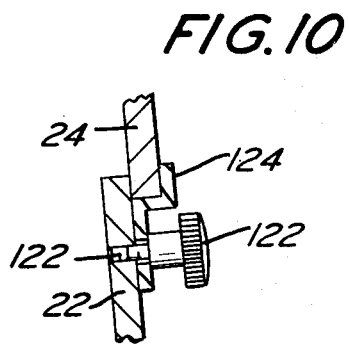
FIG. 10 is a sectional view taken along the line 10—10 in FIG. 3.

A means is provided to prevent two of the slats from tilting and thereby preventing all of the slats from tilting from a vertical to a horizontal position. Such means includes a knob 120 having a threaded shank 122. Shank 122 extends through a hole in a Z-shaped latch 124. Shank 122 is threadedly secured to base 22 with the latch 124 in engaging contact with both of the slats 24 and base 22 as shown more clearly in FIG. 10. A similar latching means is provided adjacent opposite ends of the bottommost slat, see FIG. 3.

The slats, such as slats 24 and 26 may be extruded as hollow members to facilitate inserting the middle leg of the adapters inside the slats. This would improve the external appearance of the slats. If the slats are very long due to a long window frame, it would be within the scope of the present invention to link the slats adjacent their middle so as to prevent sag. The pins such as pin 32 and their cooperating grooves such as groove 36 are preferably curved so as to prevent snagging. The uppermost slat 86 overlaps the header 20 and the lowermost slat 24 overlaps the base 22.

In FIGS. 13–16, there is illustrated another embodiment of the present invention which is identical with that described above except as will be made clear hereinafter. Hence, corresponding elements are provided with corresponding primed numerals.

Extruded housing strips 130 are secured to the frame portions 16′ at the top and bottom thereof. See FIGS. 13 and 15. The strips 130 cooperate with the frame portion to define channels 132. A vertically disposed bar 134 has its ends disposed within the channels 132 for sliding movement toward and away from the slats. Bar 134 is provided with a series of steps 135, each adapted to receive the lower edge of a slat and thereby prevent the slat from tilting. Hence, bar 134 is a latching bar adapted to lock the slats in a vertical overlapping disposition.

A bar 134′, identical with bar 134, is provided on the righthand end of the window blind, as shown more clearly in FIG. 15. Bar 134′ reciprocates within the channels 132′ in the same manner as described above. Each of the bars is provided with a knob 136. Knob 136 is connected to a threaded shaft which extends through a threaded hole in the bar. Hence, clockwise rotation of the knob 136 in FIG. 13 will latch the bar in any position along the channels 132.

As shown more clearly in FIG. 13, the slats are made from a rigid polymeric plastic material which has been internally reinforced by metal strips 138. As shown more clearly in FIG. 16, the upper tip of slat 24′ is received in a notch 140 extending along the entire length of slat 26′. The uppermost slat 86′ has its upper edge extending or disposed within a groove 146 on a plate 144 in the header 20′. The lowermost slat 24′ is in intimate contact with the base 22′. The slats are hollow at their ends and the middle leg of the adapters extends into the hollow end of each slat. Hence, the adapter need not be mechanically connected to the slats by screws.

Thus, it will be seen that the window blind of the present invention includes overlapping slats which contact one another when vertically disposed so as to prevent flow of air therebetween. The slats may be tilted, raised, or lowered by means of rotatable handles. Raising and lowering is in a guided manner by means of pins disposed on one side of the longitudinal axis of the slats and tilting is about the axis of the pins.

The present invention may be embodied in other specific forms without departing from the spirit or essential attributes thereof.

I claim:

1. A window blind comprising slats having at least one end guided for up and down movement by upright side portions, means for raising and lowering the lowermost slat and for effecting similar movement of the other slats including link means interconnecting the slats, a tilting means separate and apart from said first-mentioned means, said tilting means being coupled to the ends of the slats for tilting the slats about an axis to one side of the longitudinal axis of the slats so that the slats may be moved from a generally horizontal position to an upright position wherein the slats partially overlie one another, and said tilting means including an oscillatable upright member and an adapter coupling said member to each slat.

2. A window blind in accordance with claim 1 wherein each adapter is a T-shaped adapter having its middle leg connected to an end of each slat, each adapter having one end leg supporting a pin lying along said offset axis and extending in a groove on said side portion, the other end leg of the adapter being coupled to said upright member by a cage, the end legs being angled out of the plane of the middle leg.

3. A window blind in accordance with claim 1 wherein said means for raising and lowering the lowermost slat includes an endless flexible member extending around pulleys and having a portion connected to the lowermost slat.

4. A window blind in accordance with claim 1 wherein said member is connected at its ends to cranks which are supported by the frame portion for oscillation about axes spaced from and parallel to the longitudinal axes of said slats.

5. A window blind in accordance with claim 1 including a latch selectively engaging two adjacent slats to prevent the two slats from tilting from their vertical position.

6. A window blind in accordance with claim 1 wherein said means for tilting the slats and the means for raising the slats include separate rotary handles adjacent opposite ends of the lowermost slat.

7. A window blind in accordance with claim 1 wherein adjacent slats overlap when in a vertical position and engage so as to be airtight.

8. A window blind in accordance with claim 1 wherein an arcuate guide means is provided in cooperative relation with one of the slats to limit the extent of tilting movement.

9. A window blind in accordance with claim 1 including a vertically disposed slidable bar adjacent said side portions, said bar having steps on its forwardly projecting surface receiving the lower edge portion of slats to prevent the slats from tilting when in a position engaging the slats.

10. A window blind in accordance with claim 1 wherein the slats are hollow at their ends, and said adapter extending into the hollow ends of each slat.

11. A window blind in accordance with claim 1 including a plate having a surface contacting the uppermost edge of the uppermost slat when the slats are in a generally vertical disposition, and each slat having a notch receiving a portion of the next adjacent slat when the slats are generally vertically disposed and engaging one another, thereby rendering the blind airtight.

12. An article of manufacture for use in a window blind comprising a slat having a T-shaped adapter at each end, the middle leg of each adapter being generally parallel to the general plane of the slat and being connected to an end of the slat and extending therebeyond, the end legs of the adapters diverging upwardly from the middle leg, and a rotatable pin carried by each end leg of each adapter, the axis of each pin being generally parallel to the general plane of the slat.

13. An article in accordance with claim 12 including a cage means for connecting at least one of the adapters to an actuator for rotating the slat, said cage means extending in a direction away from the slat, and said cage means being coupled to one of said end legs by the rotatable pin on said one end leg.

References Cited

UNITED STATES PATENTS

| | | | |
|---|---|---|---|
| 163,690 | 5/1875 | Peyer | 49—403 |
| 2,128,163 | 8/1938 | Pratt | 160—172 X |
| 2,167,840 | 8/1939 | Hepworth. | |
| 2,188,300 | 1/1940 | Mishlenick | 160—165 X |
| 2,299,095 | 10/1942 | Knox | 160—172 |
| 2,557,978 | 6/1951 | Krumm | 160—172 X |
| 2,874,771 | 2/1959 | Muhr | 160—172 X |
| 3,008,519 | 11/1961 | Hawkins | 160—172 X |
| 3,110,936 | 11/1963 | Berard | 49—403 X |
| 3,290,823 | 12/1966 | Okumoto | 49—74 X |
| 3,327,426 | 6/1967 | Spicer | 49—74 |

PETER M. CAUN, Primary Examiner

U.S. Cl. X.R.

160—168, 172, 176